(12) United States Patent
Mai

(10) Patent No.: US 10,955,364 B2
(45) Date of Patent: Mar. 23, 2021

(54) METHOD FOR CONTROLLING SURFACE ERRORS OF SAMPLE IN HOMOGENEITY MEASUREMENT OF INFRARED OPTICAL MATERIALS

(71) Applicant: China North Standardization Center, Beijing (CN)

(72) Inventor: Lyubo Mai, Beijing (CN)

(73) Assignee: China North Standardization Center, Beijing (CN)

( * ) Notice: Subject to any disclaimer, the term of this patent is extended or adjusted under 35 U.S.C. 154(b) by 0 days.

(21) Appl. No.: 16/939,798

(22) Filed: Jul. 27, 2020

(65) Prior Publication Data

US 2020/0355625 A1    Nov. 12, 2020

Related U.S. Application Data

(63) Continuation of application No. PCT/CN2019/109386, filed on Sep. 30, 2019.

(30) Foreign Application Priority Data

Oct. 19, 2018  (CN) .......................... 201811219047.1

(51) Int. Cl.
  *G01N 21/45* (2006.01)
  *G01N 21/958* (2006.01)
(52) U.S. Cl.
  CPC ........... *G01N 21/958* (2013.01); *G01N 21/45* (2013.01)

(58) Field of Classification Search
  CPC ............................. G01N 21/958; G01N 21/45
  See application file for complete search history.

(56) References Cited

U.S. PATENT DOCUMENTS

| | | | |
|---|---|---|---|
| 6,344,898 B1 * | 2/2002 | Gemma | G01B 11/255 356/513 |
| 2002/0021451 A1 * | 2/2002 | Hill | G01Q 70/06 356/511 |

(Continued)

FOREIGN PATENT DOCUMENTS

| | | |
|---|---|---|
| CN | 102607461 A | 11/2006 |
| CN | 101251497 A | 8/2008 |

(Continued)

*Primary Examiner* — Mohamed Charioui
*Assistant Examiner* — Eyob Hagos

(57) ABSTRACT

Disclosed is a method for controlling surface errors of a sample in a homogeneity measurement of infrared optical materials. In this invention, a calculation relationship among the surface errors, measurement principles and precision requirements is established. The wavefront distortion caused by the surface errors of the sample measured in infrared wavebands is converted to the surface errors of the sample which is processed and inspected under the visible light. Through establishing related algorithms and formulas for numerical calculations, a numerical table for controlling the surface errors of the sample is created to ensure the precision of the homogeneity measurement for the infrared optical material under short, middle and long wavebands. A case table for controlling the surface errors of the sample is also provided to ensure the precision of the homogeneity measurement for the specific infrared optical materials under short, middle and long wavebands.

9 Claims, 2 Drawing Sheets

(56) References Cited

U.S. PATENT DOCUMENTS

| | | | | |
|---|---|---|---|---|
| 2012/0044501 A1* | 2/2012 | Oikaze | ............... | G01B 9/02088 |
| | | | | 356/503 |
| 2014/0009765 A1* | 1/2014 | Sugimoto | .............. | G01N 21/45 |
| | | | | 356/517 |
| 2014/0218684 A1* | 8/2014 | Kumar | ................. | A61B 3/0025 |
| | | | | 351/206 |
| 2016/0003740 A1* | 1/2016 | Tao | .................... | G01N 21/6458 |
| | | | | 250/459.1 |
| 2016/0356707 A1* | 12/2016 | Sugimoto | .......... | G01N 21/4133 |

FOREIGN PATENT DOCUMENTS

| CN | 102607461 A | * | 7/2012 |
|---|---|---|---|
| CN | 102928200 A | * | 2/2013 |
| CN | 102928200 A | | 2/2013 |
| CN | 103335982 A | * | 10/2013 |
| CN | 103558221 A | * | 2/2014 |
| CN | 103558221 A | | 2/2014 |
| CN | 105572050 A | * | 5/2016 |
| CN | 105572050 A | | 5/2016 |
| JP | 2008139196 A | | 6/2008 |

\* cited by examiner

METHOD FOR CONTROLLING SURFACE ERRORS OF SAMPLE IN HOMOGENEITY MEASUREMENT OF INFRARED OPTICAL MATERIALS

CROSS-REFERENCE TO RELATED APPLICATIONS

This application is a continuation of International Patent Application No. PCT/CN2019/109386, with a filling date of Sep. 27, 2019, designating the United States, now pending, and further claims the benefit of priority from Chinese Patent Application No. 201811219047.1, with a filling date of Oct. 19, 2018. The content of the aforementioned applications, including any intervening amendments thereto, is incorporated herein by reference in its entirety.

TECHNICAL FIELD

The present application relates to homogeneity measurements for infrared optical materials, and more particularly to a method for controlling the surface errors of a sample in homogeneity measurements of infrared optical materials.

BACKGROUND OF THE INVENTION

The homogeneity measurement of infrared optical materials is a high-precision measurement, in which a refractive index homogeneity of the infrared optical material is measured. The measurement method is an interferometry in which a wavefront distortion of plane waves of test beams caused by inhomogeneity of the infrared optical material is obtained through an interferometer. The measurement precision is usually required up to $1\times10^{-4}$-$1\times10^{-5}$ due to different measurement precision requirements. In order to ensure the high precision of the refractive index homogeneity measurement, a general approach is to improve the precisions of measurement equipment and measurement methods. In fact, the high-precision measurement cannot be achieved merely through improving the precisions of measurement equipment and measurement methods, even though the ambient temperature influence on the measurement precision in the measurement room is also required to be evaluated and controlled. In addition, the surface errors or flatness errors of the sample also greatly affect the measurement precision. The surface errors of the sample can cause wavefront distortion of the beam that transmits through the sample, which can be observed through an interferometer. However, the phenomenon of the wavefront distortion caused by the surface errors of the sample is the same as the that of the wavefront distortion caused by the refractive index inhomogeneity of the infrared optical material. Therefore, it is impossible to distinguish the wavefront distortion caused by the surface errors of the sample from the wavefront distortion caused by the refractive index inhomogeneity of infrared optical materials. Thus, in order to ensure the precision of the homogeneity measurement of the infrared optical material, it is required to find a method to calculate the impact of surface errors of the sample on refractive index homogeneity measurement of the materials and calculate a reference value for controlling the surface errors of the sample, so as to realize an accurate quantitative control for the surface processing of samples and guarantee that results of the homogeneity measurement for infrared optical materials are only influenced by the inhomogeneity of the optical materials, thereby making measurement results reflect actual situations of the material inhomogeneity.

In the prior art, there is no algorithm to quantitatively calculate the surface errors of the sample in the homogeneity measurement of infrared optical materials. Though it is known that the surface errors of the sample adversely affect the measurement precision, there is no algorithm to analyze how much the surface errors affect the measurement results. Therefore, the sample optical surface is merely required to be processed as well as possible, causing that the optical surface of the sample is prone to being insufficiently or excessively processed. When the optical surface of the sample is insufficiently processed, the homogeneity measurement of the infrared optical materials is carried out with the surface errors of the sample that is significantly higher than the surface errors required by the measurement precision, resulting in the unbelievable and useless results of the homogeneity measurement of the infrared optical materials. When the optical surface of the sample is excessively processed, high cost should be paid to process the sample, resulting in waste of money and time.

SUMMARY OF THE INVENTION

This invention aims to provide a method for controlling surface errors of a sample in homogeneity measurement of infrared optical materials, by which the surface errors of the sample are accurately controlled to ensure an intended precision of the homogeneity measurement of the infrared optical materials.

The technical solutions of the invention are described as follows.

The invention provides a method for controlling surface errors of a sample in homogeneity measurement of infrared optical materials, comprising:

1) setting the surface error of the sample as $S_{im}$, a nominal refractive index of the sample as $n_0$, the number of times with which an infrared radiation flux transmits through the sample as N and a wavefront distortion of reference beam waves caused by the surface errors of the sample as $\Delta W_S$; and calculating $\Delta W_S$ according to equation (1):

$$\Delta W_S = 2N(n_0-1)S_{im} \quad (1);$$

2) establishing a relationship between the wavefront distortion $\Delta W_S$ and a wave error $\Delta W_p$ of permissible precision requirements of an interferometer for refractive index homogeneity measurements:

$$\Delta W_S \leq k\Delta W_P \quad (2);$$

wherein k is the precision control factor;

plugging the equation (1) into the inequation (2) to obtain inequation (3):

$$S_{im} \leq k\frac{\Delta W_P}{2N(n_0-1)}; \quad (3)$$

3) determining the number N according to measurement principle of the interferometer;

4) obtaining the wavefront error $\Delta W_p$ of the permissible precision requirements of an interferometer according to permissible precision of the interferometer:

calculating the wave error $\Delta W_p$ according to equation (4):

$$\Delta W_p = \frac{\lambda_i}{5}; \quad (4)$$

wherein $\lambda_i$ is the infrared wavelength for measurement;

plugging the equation (4) into the inequation (3) to obtain inequation (5):

$$S_{im} \leq k\frac{\lambda_i}{10N(n_0 - 1)}; \quad (5)$$

5) setting a visible wavelength for inspecting an infrared optical sample as $\lambda_v$, and setting a ratio of the infrared wavelength $\lambda_i$ to the visible wavelength $\lambda_v$ as R;

wherein R is expressed as equation (6):

$$R = \frac{\lambda_i}{\lambda_v}; \quad (6)$$

(6) plugging the equation (6) into the inequation (5) to obtain inequation (7), so that the surface errors of the sample are measured with the visible wavelength, wherein the inequation (7) is expressed as:

$$S_{im} \leq k\frac{R\lambda_v}{10N(n_0 - 1)}; \quad (7)$$

7) since the visible wavelength $\lambda_v$ is 0.6328 and infrared wavebands are classified into a short infrared waveband with a mean wavelength $\lambda_s$ of 2 μm, a middle infrared waveband with a mean wavelength $\lambda_m$ of 4 μm and a long infrared waveband with a mean wavelength $\lambda_l$ of 10 μm, dividing $\lambda_s$ by $\lambda_v$ to obtain a ratio $R_s$ of approximately 3.16:1; dividing $\lambda_m$ by $\lambda_v$ to obtain a ratio $R_m$ of approximately 6.32:1; and dividing $\lambda_l$ by $\lambda_v$ to obtain a ratio $R_l$ of approximately 15.8:1;

8) plugging the ratios $R_s$, $R_m$ and $R_l$ obtained in step 7) into the inequation (7) to establish a numerical table for controlling the surface errors of the sample corresponding to precision requirements of the homogeneity measurements for infrared optical materials, thereby establishing a relationship between control values of the surface errors of the sample and various precision requirements for the measurement applications of various infrared wavebands and interferometers which vary in principles; and (9) controlling the surface errors of the sample in the homogeneity measurements of infrared optical materials based on the precision requirements of the homogeneity measurements of the infrared optical materials and the surface errors shown in the numerical table.

In an embodiment, k is 1, ½ or ⅓, and the smaller a value of k, the smaller an influence of the surface errors of the sample on the measurement precision.

In an embodiment, in step (3), the infrared radiation flux transmits through the sample twice (N=2) when a Fizeau interferometer is used to measure the refractive index homogeneity; the infrared radiation flux transmits through the sample twice (N=2) when a Twyman-Green interferometer is used to measure refractive index homogeneity; and the infrared radiation flux transmits through the sample once (N=1) when a Mach-Zehnder interferometer. is used to measure the refractive index homogeneity.

In an embodiment, the numerical table established in step (8) is shown in Table 1:

TABLE 1

Numerical table for controlling the surface errors of the sample corresponding to the precision requirements of the homogeneity measurements for infrared optical materials

| Number of times the infrared radiation flux transmits through the sample | Permissible surface errors in visible waveband | | |
|---|---|---|---|
| | Short infrared waveband | Middle infrared waveband | Long infrared waveband |
| N = 1 | $k\frac{0.316\lambda_v}{n_0 - 1}$ | $k\frac{0.632\lambda_v}{n_0 - 1}$ | $k\frac{1.58\lambda_v}{n_0 - 1}$ |
| N = 2 (without consideration of surface error mutual offsetting) | $k\frac{0.158\lambda_v}{n_0 - 1}$ | $k\frac{0.316\lambda_v}{n_0 - 1}$ | $k\frac{0.79\lambda_v}{n_0 - 1}$ |
| N = 2 (with surface error mutual offsetting) | $k\frac{0.632\lambda_v}{n_0 - 1}$ | $k\frac{1.264\lambda_v}{n_0 - 1}$ | $k\frac{3.16\lambda_v}{n_0 - 1}$ |

In an embodiment, the surface errors of the sample for the homogeneity measurements are equal to or less than the values shown in Table 1.

In an embodiment, in Table 1, there are two measurement principles when N=2; one measurement principle is that the sample shape for measuring is a plane parallel plate sample, and the other measurement principle is that a sample shape for measuring is a wedge-shaped sample; and requirements of the surface errors of the wedge-shaped sample are lowered, since the surface errors of the sample are mutually subtracted by a measurement principle of the wedge-shaped sample.

In an embodiment, before the step 9), the method further comprises:

plugging the precision control factor k of 1 and a nominal refractive index $n_0$ of an infrared chalcogenide optical material of 2.6 to obtain a case table 2:

TABLE 2

Case table for controlling the surface errors of the sample corresponding to the precision requirements of the homogeneity measurements for infrared optical materials

| Number of times the infrared radiation flux transmits through the sample | Permissible surface errors in visible waveband | | |
|---|---|---|---|
| | Short infrared waveband | Middle infrared waveband | Long infrared waveband |
| N = 1 | $\lambda_v/5$ | $2\lambda_v/5$ | $\lambda_v$ |
| N = 2 (without consideration of surface error mutual offsetting) | $\lambda_v/10$ | $\lambda_v/5$ | $\lambda_v/2$ |
| N = 2 (with surface error mutual offsetting) | $2\lambda_v/5$ | $4\lambda_v/5$ | $2\lambda_v$ |

In an embodiment, in step (9), the surface errors of the sample in the homogeneity measurements of the infrared chalcogenide optical materials and other infrared optical materials with refractive indexes same or nearly same to refractive indexes of the infrared chalcogenide optical materials are controlled based on the precision requirements of the homogeneity measurements of infrared optical materials and the surface errors of the sample shown in Table 2. Most of the infrared optical materials in the application have a refractive index of 2.6 or nearly 2.6.

The beneficial effects of the invention are described as follows.

In this invention, a calculation relationship among the surface errors, measurement principles and precision requirements is established. The wavefront distortion caused by the surface errors of the sample measured in infrared wavebands is converted to the surface errors of the sample which is processed and inspected under the visible light. Through establishing related algorithms and formulas for numerical calculations, a numerical table for controlling the surface errors of the sample is created to ensure the precision of the homogeneity measurement for infrared optical materials under short, middle and long wavebands. A case table for controlling the surface errors of the sample is also provided to ensure the precision of the homogeneity measurement for the specific infrared optical materials under short, middle and long wavebands. The invention provides specific values for controlling the surface errors of the sample to ensure the precision of the homogeneity measurement for the optical materials under infrared short, middle and long wavebands.

DETAILED DESCRIPTION OF EMBODIMENTS

This invention will be further described below in detail with reference to the accompanying drawings and embodiments to make the purpose, content and advantages of the invention clearer.

The invention sets an equation to calculate a wavefront distortion of a test light beam caused by surface errors of a sample of infrared optical materials; the wavefront distortion caused by the surface errors is made to be less than or equal to a product of a wavefront distortion in accordance with precision requirements of a refractive index homogeneity measurement performed by interferometers and a precision control factor (≤1). The measurement precision requirements in infrared wavebands corresponding to controlling the surface errors of the sample measured with infrared radiation is converted to the surface errors of the sample which is inspected with visible light. A numerical table is established to control the surface errors of the sample which is processed and inspected with the visible light, where various wavebands (such as short, middle and long wavebands) used by the infrared optical materials and interferometers which vary in principles are involved, thereby providing algorithms and quantitative relationships to control the surface errors of the sample in the homogeneity measurement of infrared optical materials. The technical solution described herein offers accurate guidance for controlling the surface errors of the sample, so as to ensure the homogeneity measurement precision of infrared optical materials.

The invention provides a method for controlling the surface errors of a sample in a homogeneity measurement of infrared optical materials, which is specifically described as follows.

1) The refractive index homogeneity of the infrared optical materials is generally measured through an interferometry. The refractive index inhomogeneity problems in infrared optical materials are obtained by measuring the wavefront distortion of reference beam waves (which are usually plane waves) which transmit through the sample. The distortion of the reference plane waves can be caused by the refractive index inhomogeneity of infrared optical materials, as well as the surface errors or surface flatness error of the infrared optical samples. The surface errors or flatness errors of the sample is set as $S_{im}$, and a nominal refractive index of the sample is set as $n_0$, and the number of times with which an infrared radiation flux transmits through the sample is set as N, and two surfaces of the sample are assumed to have the same or approximately the same surface errors. The wavefront distortion of the reference light waves caused by the surface errors of the sample is set as $\Delta W_S$, which is calculated according to equation (1):

$$\Delta W_S = 2N(n_0-1)S_{im} \qquad (1).$$

Figure 1:
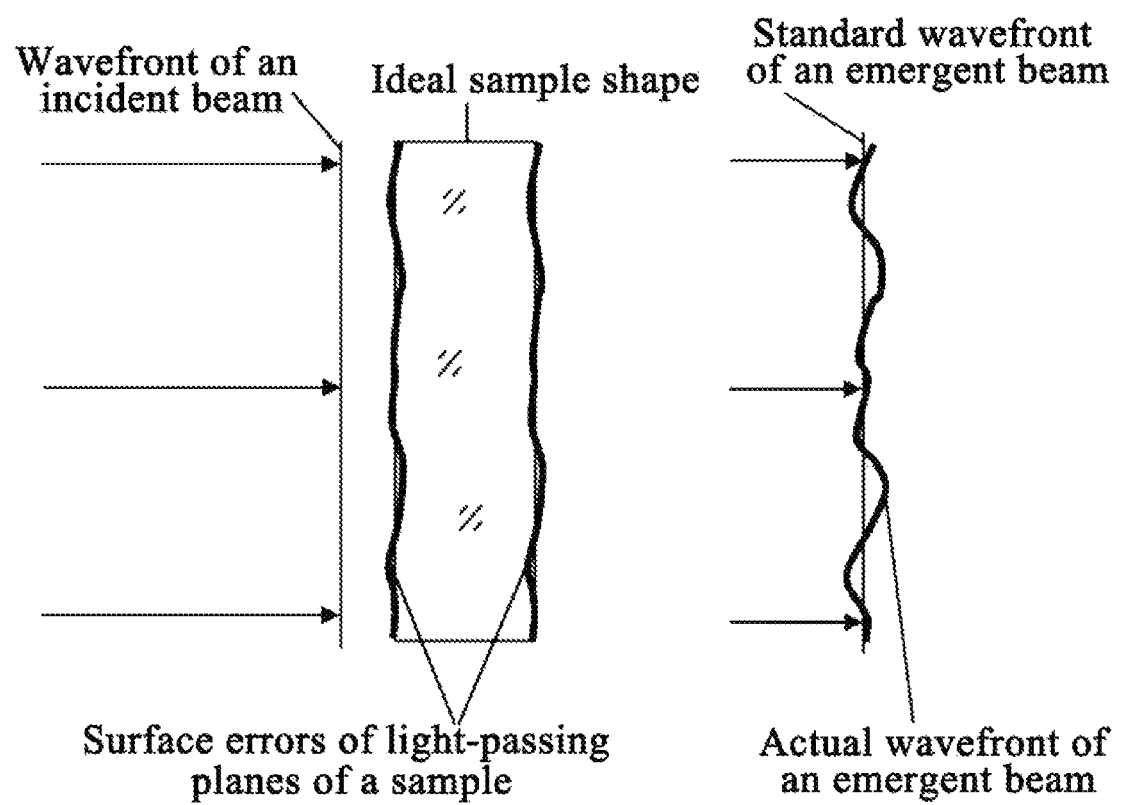
FIG. 1 schematically shows a wavefront distortion caused by surface errors of a sample in an infrared optical material.

Even if the infrared optical sample has desired refractive index homogeneity, the surface errors of the sample will cause a significant emergent wavefront distortion after the incident plane waves transmit through the sample, as shown in FIG. 1. Such significant emergent wavefront deformation is attributed to two factors. The first factor is surface errors superposition of two surfaces of the sample. The second factor is that the superposition of the surface errors of the sample is amplified by the high refractive index of the infrared materials.

Figure 2:
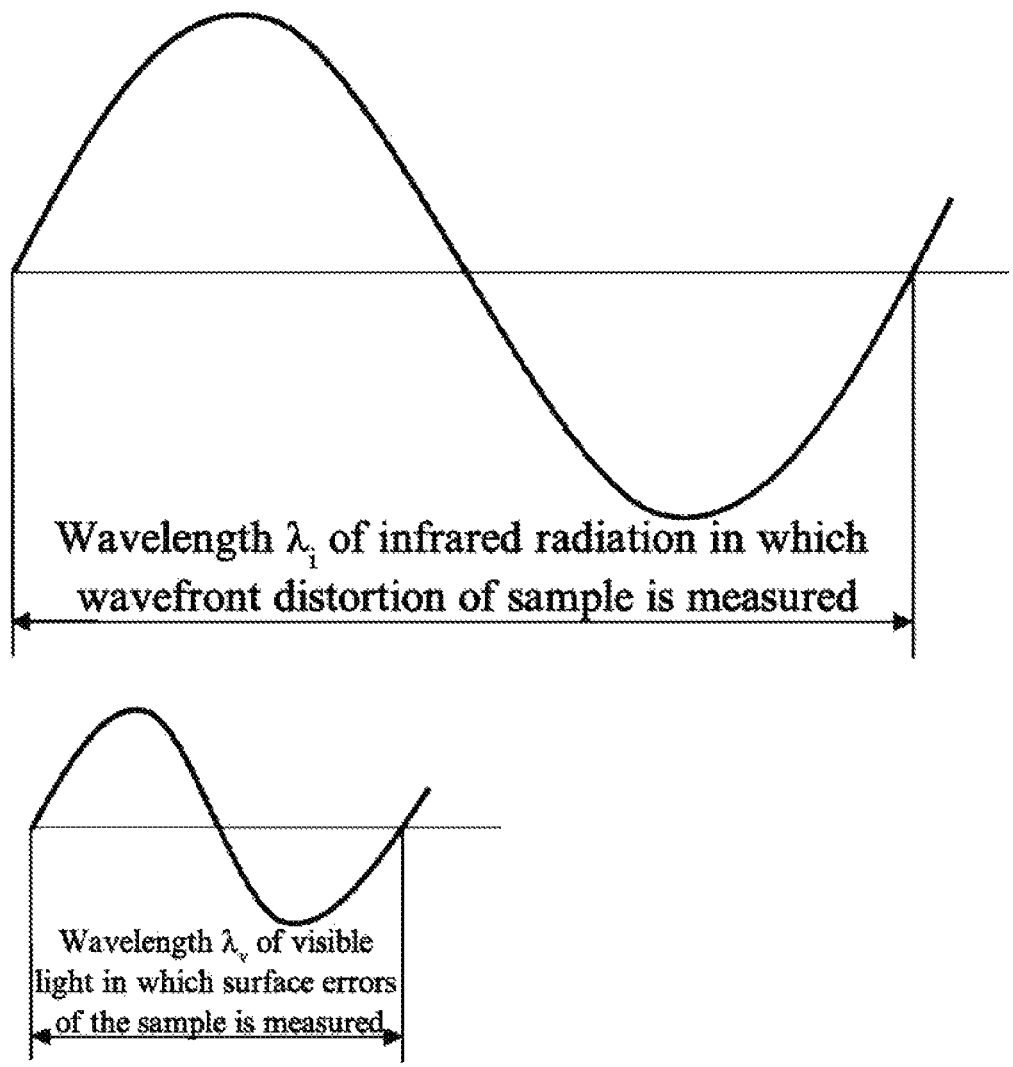
FIG. 2 shows a comparison of a wavelength of infrared radiation with which homogeneity of infrared optical samples is measured and a wavelength of visible light with which the surface error of the infrared optical samples is inspected and evaluated.

(2) In order to ensure the homogeneity measurement precision of infrared optical materials, the wavefront distortion $\Delta W_S$ of the reference waves caused by the surface errors $S_{im}$ of the sample is required to be less than or equal to a product of a wave error $\Delta W_p$ and a precision control factor k, where the wave error $\Delta W_p$ is in accordance with permissible precision requirements of the refractive index homogeneity measurement interferometers, and k may be 1, ½ or ⅓. The smaller the value of k, the smaller an influence of the surface errors on the measurement precision. FIG. 2 shows the relationship between the wavefront distortion $\Delta W_S$ and the wave error $\Delta W_p$, which are expressed as inequation (2):

$$\Delta W_S \leq k \Delta W_P \qquad (2).$$

The equation (1) is plugged into the inequation (2) to obtain inequation (3):

$$S_{im} \leq k \frac{\Delta W_P}{2N(n_0-1)}. \qquad (3)$$

(3) The number N is determined according to the principles of the interferometer used for measurement. The infrared radiation flux transmits through the sample twice (N=2) when a Fizeau interferometer is used to measure refractive index homogeneity; the infrared radiation flux transmits through the sample twice (N=2) when a Twyman-Green interferometer is used to measure refractive index homogeneity; and the infrared radiation flux transmits through the sample once (N=1) when a Mach-Zehnder interferometer is used to measure refractive index homogeneity.

(4) Permissible precision of the interferometer is determined. When anyone among the Fizeau interferometer, the Twyman-Green interferometer and the Mach-Zehnder interferometer is used in the homogeneity measurement of the infrared optical material, the wavefront error $\Delta W_p$ in accordance with measurement precision requirements of the interferometers is usually one-fifth of an infrared wavelength $\lambda_i$ for measurement, and thus $\Delta W_p$ is calculated according to equation (4):

$$\Delta W_p = \frac{\lambda_i}{5}. \tag{4}$$

The equation (4) is plugged into the inequation (3) to obtain inequation (5):

$$S_{im} \leq k \frac{\lambda_i}{10N(n_0 - 1)}. \tag{5}$$

(5) Although the homogeneity of infrared optical materials is measured with an infrared light source using an infrared interferometer, the infrared optical sample is processed and inspected with visible light. Therefore, the surface errors of the sample measured with the infrared wavelength should be converted to the surface errors of the sample measured with visible light wavelength, so as to accord with the actual processing and inspection situation of the infrared sample. The visible wavelength for inspecting an infrared optical sample is set as $\lambda_v$. A ratio of the infrared wavelength $\lambda_i$ used in measuring the infrared sample to the visible wavelength $\lambda_v$ is set as R which is expressed as equation (6):

$$R = \frac{\lambda_i}{\lambda_v}. \tag{6}$$

(6) The equation (6) is plugged into the inequation (5) to obtain inequation (7), so that the surface errors of the sample of infrared optical materials are measured by the wavelength of the visible light, where the inequation (7) is expressed as:

$$S_{im} \leq k \frac{R\lambda_v}{10N(n_0 - 1)}. \tag{7}$$

(7) Since the visible wavelength $\lambda_v$ is 0.6328 μm, and infrared wavebands are classified into a short infrared waveband with a mean wavelength $\lambda_s$ of 2 μm, a middle infrared waveband with a mean wavelength $\lambda_m$ of 4 μm and a long infrared waveband with a mean wavelength $\lambda_1$ of 10 μm. $\lambda_s$ is divided by $\lambda_v$ to obtain a ratio $R_s$ of approximately 3.16:1; $\lambda_m$ is divided by $\lambda_v$ to obtain a ratio $R_m$ of approximately 6.32:1; and $\lambda_1$ is divided by $\lambda_v$ to obtain a ratio $R_1$ of approximately 15.8:1.

(8) The ratios $R_s$, $R_m$ and $R_1$ of various infrared wavebands are respectively plugged into the inequation (7) to establish a numerical table for controlling the surface errors of the sample corresponding to the precision requirements of the homogeneity measurement of infrared optical materials, as shown in Table 1, thereby establishing a relationship between control values of the surface errors of the sample and the various precision requirements of homogeneity measurement applications of various infrared wavebands and interferometers which vary in principles. The surface errors of the sample for homogeneity measurement should be selected by equal to or less than the values shown in Table 1. Referring to Table 1, there are two measurement principles when N=2. One measurement principle is that a sample shape for measuring is a plane parallel plate sample, and the other measurement principle is that the sample shape for measuring is a wedge-shaped sample. The surface errors of the two surface sides of the sample cannot be mutually subtracted when the measurement principle for the plane parallel plate sample is used, and the surface errors of the two surface sides of the sample can be partly mutually subtracted when the measurement principle for the wedge-shaped sample is used. Thus, requirements for the surface errors of the sample can be lowered when the measurement principle for the wedge-shaped sample is used.

TABLE 1

Numerical table for controlling the surface errors of the sample corresponding to the precision requirements of the homogeneity measurements for infrared optical materials

| Number of times the infrared radiation flux transmits through the sample | Permissible surface errors in visible waveband | | |
|---|---|---|---|
| | Short infrared waveband | Middle infrared waveband | Long infrared waveband |
| N = 1 | $k\frac{0.316\lambda_v}{n_0 - 1}$ | $k\frac{0.632\lambda_v}{n_0 - 1}$ | $k\frac{1.58\lambda_v}{n_0 - 1}$ |
| N = 2 (without consideration of surface error mutual offsetting) | $k\frac{0.158\lambda_v}{n_0 - 1}$ | $k\frac{0.316\lambda_v}{n_0 - 1}$ | $k\frac{0.79\lambda_v}{n_0 - 1}$ |
| N = 2 (with surface error mutual offsetting) | $k\frac{0.632\lambda_v}{n_0 - 1}$ | $k\frac{1.264\lambda_v}{n_0 - 1}$ | $k\frac{3.16\lambda_v}{n_0 - 1}$ |

(9) A typical value of the precision control factor k is 1, and the nominal refractive index $n_o$ of the chalcogenide infrared optical materials which are used frequently is 2.6. k=1 and $n_0$=2.6 are plugged into Table 1 in step (8) to obtain a commonly used case table, as shown in Table 2.

TABLE 2

Case table for controlling the surface errors of the sample corresponding to the precision requirements of the homogeneity measurement for the infrared optical materials

| Number of times the infrared radiation flux transmits through the sample | Permissible surface errors in visible waveband | | |
|---|---|---|---|
| | Short infrared waveband | Middle infrared waveband | Long infrared waveband |
| N = 1 | $\lambda_v/5$ | $2\lambda_v/5$ | $\lambda_v$ |
| N = 2 (without consideration of surface error mutual offsetting) | $\lambda_v/10$ | $\lambda_v/5$ | $\lambda_v/2$ |
| N = 2 (with surface error mutual offsetting) | $2\lambda_v/5$ | $4\lambda_v/5$ | $2\lambda_v$ |

(10) The surface errors of the sample in the homogeneity measurement of the infrared optical materials can be controlled based on the precision requirements of the homogeneity measurement for the infrared optical materials and the surface errors of the sample shown in Table 1; the surface errors of the sample in the homogeneity measurement of the infrared optical materials of which refractive indexes are the same or close to that of the infrared chalcogenide optical material can be controlled based on the precision requirements of the homogeneity measurements of the infrared optical materials and the permissible surface errors of the sample shown in Table 2.

It can be seen that in this application, a calculation relationship among the surface errors of the sample in the homogeneity measurement of the infrared optical materials, the measurement principles and the precision requirements is established. The wavefront distortion caused by the surface errors of the sample measured with infrared radiation should be converted to the surface errors of the sample which is processed and inspected with the visible light. Through establishing related algorithms and formulas for numerical calculations, a numerical table for controlling the surface errors of the sample is created to ensure the precision of the homogeneity measurement for the infrared optical materials under short, middle and long wavebands. The calculation is further performed to establish the case table for controlling the surface errors of the sample to ensure the precision of the homogeneity measurement for the infrared optical materials under short, middle and long wavebands. The invention provides specific values of the surface errors of the sample to ensure the precision of the homogeneity measurement for the optical materials under short, middle and long wavebands. Moreover, the technical ideas and algorithms of the application can also be applied to control the surface errors of the samples for the homogeneity measurement of optical materials in visible light, ultraviolet light wavebands, etc., in the same way.

The invention aims to eliminate the effect of surface errors of samples of various infrared optical materials, such as infrared optical crystal, infrared glass and infrared ceramic, on the precision of the refractive index homogeneity measurement, so as to allow the measurement results of the homogeneity measurement for the infrared optical materials to reflect real situations of the materials. Through the algorithms shown in Table 1, lot of case tables for controlling the surface errors of the sample of the homogeneity measurement for infrared optical materials can be obtained based on refractive indexes of various infrared optical materials and various precision requirements control factor values, thereby facilitating controlling the surface errors of the samples of the various infrared optical materials.

The above are merely exemplary embodiments of the invention. It should be noted that, any improvements and modifications made by those skilled in the art without departing from the technical principles of the invention shall fall within the scope of the invention.

What is claimed is:

1. A method for processing and inspecting a sample, comprising:

controlling surface errors of the sample in homogeneity measurements of infrared optical materials, comprising steps of:
1) setting the surface error of the sample as $S_{im}$, a nominal refractive index of the sample as no, the number of times with which an infrared radiation flux transmits through a surface of the sample as N and a wavefront distortion of reference beam waves caused by the surface errors of the sample as $\Delta W_s$; and calculating $\Delta W_s$ according to equation (1):

$$\Delta W_S = 2N(n_0-1)S_{im} \quad (1);$$

2) establishing a relationship between the wavefront distortion $\Delta W_s$ and a wave error $\Delta W_p$ of permissible precision requirements of an interferometer for refractive index homogeneity measurements:

$$\Delta W_S \leq k \Delta W_P \quad (2);$$

wherein k is the precision control factor;
plugging the equation (1) into the inequation (2) to obtain inequation (3):

$$S_{im} \leq k \frac{\Delta W_P}{2N(n_0 - 1)}; \quad (3)$$

3) determining the number N according to measurement principles of the interferometer;
4) obtaining the wave error $\Delta W_p$ of the permissible precision requirements of the interferometer according to permissible precision of the interferometer, and calculating the wave error $\Delta W_p$ according to equation (4):

$$\Delta W_p = \frac{\lambda_i}{5}; \quad (4)$$

wherein $\lambda_i$ is the infrared wavelength for measurement;
plugging the equation (4) into the inequation (3) to obtain inequation (5):

$$S_{im} \leq k \frac{\lambda_i}{10N(n_0 - 1)}; \quad (5)$$

5) setting a visible wavelength for inspecting an infrared optical sample as $\lambda_v$, and setting a ratio of the infrared wavelength $\lambda_i$ to the visible wavelength $\lambda_v$ as R;
wherein R is expressed as equation (6):

$$R = \frac{\lambda_i}{\lambda_v}; \quad (6)$$

6) plugging the equation (6) into the inequation (5) to obtain inequation (7), so that the surface errors of the sample are measured with the visible wavelength, wherein the inequation (7) is expressed as:

$$S_{im} \leq k \frac{R\lambda_v}{10N(n_0 - 1)}; \quad (7)$$

7) since the visible wavelength $\lambda_v$ is 0.6328 μm, and infrared wavebands are classified into a short infrared waveband with a mean wavelength $\lambda_s$ of 2 μm, a middle infrared waveband with a mean wavelength $\lambda_m$ of 4 μm and a long infrared waveband with a mean wavelength $\lambda_l$ of 10 μm, dividing $\lambda_s$ by $\lambda_v$ to obtain a ratio $R_s$ of approximately 3.16:1; dividing $\lambda_m$ by $\lambda_v$ to obtain a ratio $R_m$ of approximately 6.32:1; and dividing $\lambda_l$ by $\lambda_v$ to obtain a ratio $R_1$ of approximately 15.8:1;
8) plugging the ratios $R_s$, $R_m$ and $R_1$ obtained in step (7) into the inequation (7) to establish a numerical table for controlling of the surface errors of the sample corresponding to precision requirements of the homogeneity measurements for the infrared optical materials, thereby establishing a relationship between control values of the surface errors of the sample and various precision requirements for measurement applications of various infrared wavebands and interferometers which vary in principles; and 9) controlling the surface errors of the sample in the homogeneity measurements of the infrared optical materials based on the precision requirements of the homogeneity measurements of the infrared optical materials and the surface errors shown in the numerical table.; and processing and inspecting the sample under visible light according to controlled surface errors of the sample.

2. The method of claim 1, wherein k is 1, ½ or ⅓, and the smaller a value of k, the smaller an influence of the surface errors of the sample on the measurement precision.

3. The method of claim 1, wherein in step 3), the infrared radiation flux transmits through the sample twice (N=2) when a Fizeau interferometer is used to measure refractive index homogeneity; the infrared radiation flux transmits through the sample twice (N=2) when a Twyman-Green interferometer is used to measure the refractive index homogeneity; and the infrared radiation flux transmits through the sample once (N=1) when a Mach-Zehnder interferometer is used to measure the refractive index homogeneity.

4. The method of claim 1, wherein the numerical table established in step 8) is shown in Table 1:

TABLE 1

Numerical table for controlling the surface errors of the sample corresponding to the precision requirements of the homogeneity measurements for infrared optical materials

| Number of times the infrared radiation flux transmits through the sample | Permissible surface errors in visible waveband | | |
| --- | --- | --- | --- |
| | Short infrared waveband | Middle infrared waveband | Long infrared waveband |
| N = 1 | $k\dfrac{0.316\lambda_v}{n_0 - 1}$ | $k\dfrac{0.632\lambda_v}{n_0 - 1}$ | $k\dfrac{1.58\lambda_v}{n_0 - 1}$ |
| N = 2 (without consideration of surface error mutual offsetting) | $k\dfrac{0.158\lambda_v}{n_0 - 1}$ | $k\dfrac{0.316\lambda_v}{n_0 - 1}$ | $k\dfrac{0.79\lambda_v}{n_0 - 1}$ |
| N = 2 (with surface error mutual offsetting) | $k\dfrac{0.632\lambda_v}{n_0 - 1}$ | $k\dfrac{1.264\lambda_v}{n_0 - 1}$ | $k\dfrac{3.16\lambda_v}{n_0 - 1}$. |

5. The method of claim 4, wherein the surface errors of the sample for the homogeneity measurements are equal to or less than the values shown in Table 1.

6. The method of claim 4, wherein in Table 1, there are two measurement principles when N=2; one measurement principle is that a sample shape for measuring is a plane parallel plate sample, and the other measurement principle is that the sample shape for measuring is a wedge-shaped sample; and requirements of the surface errors of the wedge-shaped sample are lowered, since the surface errors of the sample are mutually subtracted by a measurement principle of the wedge-shaped sample.

7. The method of claim 4, wherein before the step 9), the method further comprises:

plugging the precision control factor k of 1 and a nominal refractive index $n_0$ of an infrared chalcogenide optical material of 2.6 to obtain a case table 2:

TABLE 2

Case table for controlling the surface errors of the sample corresponding to the precision requirements of the homogeneity measurements for infrared optical materials

| Number of times the infrared radiation flux transmits through the sample | Permissible surface errors in visible waveband | | |
| --- | --- | --- | --- |
| | Short infrared waveband | Middle infrared waveband | Long infrared waveband |
| N = 1 | $\lambda_v/5$ | $2\lambda_v/5$ | $\lambda_v$ |
| N = 2 (without consideration of surface error mutual offsetting) | $\lambda_v/10$ | $\lambda_v/5$ | $\lambda_v/2$ |
| N = 2 (with surface error mutual offsetting). | $2\lambda_v/5$ | $4\lambda_v/5$ | $2\lambda_v$ |

8. The method of claim 4, wherein the surface errors of the sample in the homogeneity measurements of various infrared optical materials are controlled based on the precision requirements of the homogeneity measurements for the infrared optical materials and the surface errors of the sample shown in Table 1; the surface errors of the sample in the homogeneity measurements of the infrared optical materials with refractive indexes the same or close to that of the infrared chalcogenide optical material are controlled based on the precision requirements of the homogeneity measurements of the infrared optical materials and the permissible surface errors of the sample shown in Table 2.

9. The method of claim 7, wherein the surface errors of the sample in the homogeneity measurements of various infrared optical materials are controlled based on the precision requirements of the homogeneity measurements for the infrared optical materials and the surface errors of the sample shown in Table 1; the surface errors of the sample in the homogeneity measurements of the infrared optical materials with refractive indexes the same or close to that of the infrared chalcogenide optical material are controlled based on the precision requirements of the homogeneity measurements of the infrared optical materials and the permissible surface errors of the sample shown in Table 2.

* * * * *